Jan. 9, 1923. 1,441,768.
W. E. WILLIAMS.
FIXED AND DEMOUNTABLE RIM CONSTRUCTION FOR AUTOMOBILE WHEELS.
FILED SEPT 12, 1919.
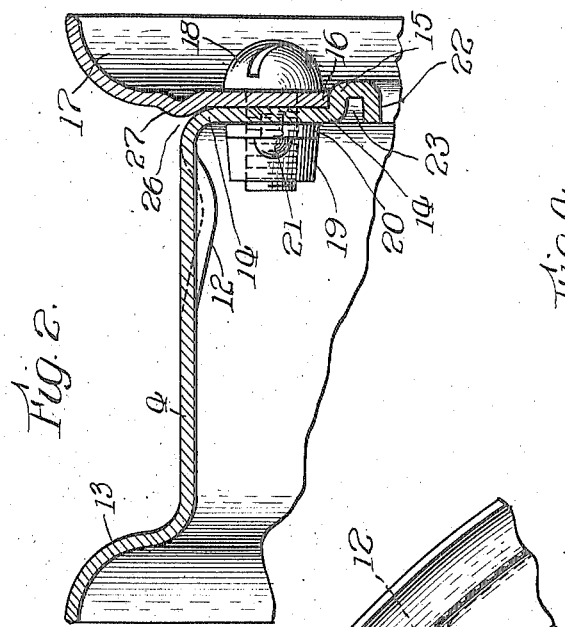
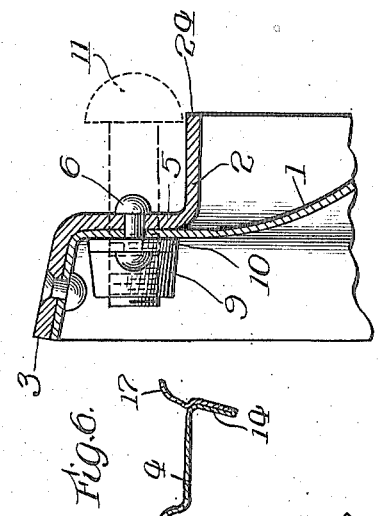
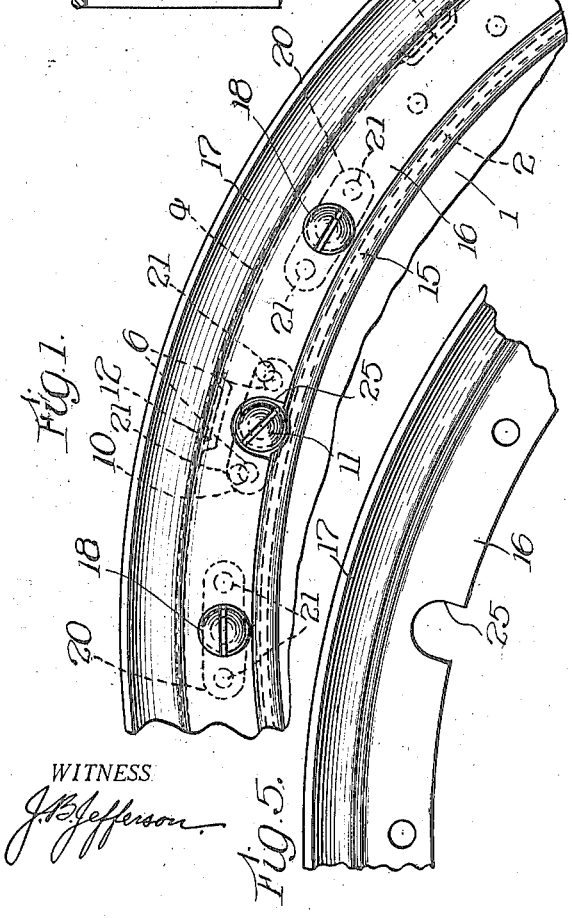
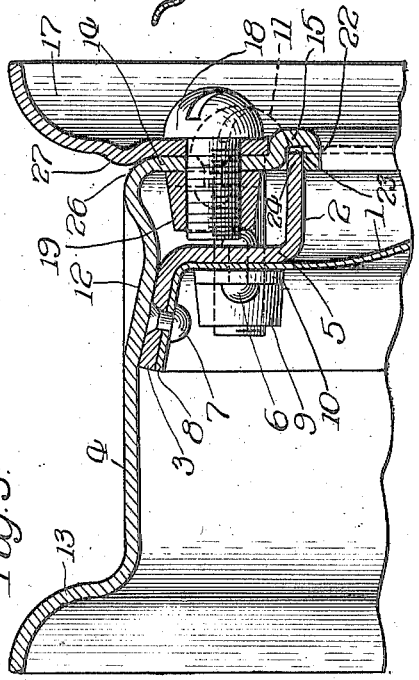
WITNESS
J. B. Jefferson
INVENTOR.
W. E. Williams Patented Jan. 9, 1923.

1,441,768

UNITED STATES PATENT OFFICE.

WILLIAM ERASTUS WILLIAMS, OF CHICAGO, ILLINOIS.

FIXED AND DEMOUNTABLE RIM CONSTRUCTION FOR AUTOMOBILE WHEELS.

Application filed September 12, 1919. Serial No. 323,315.

*To all whom it may concern:*

Be it known that I, WILLIAM ERASTUS WILLIAMS, a citizen of the United States, resident of Chicago, county of Cook, and State of Illinois, have invented a new and useful Improvement in Fixed and Demountable Rim Constructions for Automobile Wheels, of which the following is a specification.

The object of my invention is to provide a very strong and easily mounted and demounted rim which strengthens the wheel itself.

Reference will be had to the accompanying drawing in which Figure 1 is a front elevation of a part of the rim of my wheel as the same is assembled.

Figure 2 is a cross section of the rim.

Figure 3 is a cross section of the circumferential portion of a disk wheel bearing the demountable rim, and in this case a disk is shown as composing the web of the wheel.

Figure 4 is a cross section of the fixed rim shown in Figure 3.

Figure 5 is a view similar to Figure 1, showing the companion flange alone.

Figure 6 is a detail on a small scale showing the demountable rim modified as to the direction of the angle of its inward projecting flanges.

In the drawing 1 indicates a disk, here shown as being the web of the wheel, in place of spokes. However, wire spokes may be used in place of this disk web, as also may wooden spokes be used when the fixed rim 2 is slightly modified as to its shape.

The fixed rim 2 is here shown as having a regular annular inclined flange 3. This flange as shown in the drawing is the regular annular flange.

The fixed rim 2 is provided with the vertically arranged main portion 5, to which the disk 1 is secured by rivets 6. Other rivets 7 rivet a flange 8 of the disk 1 to the flange 3 of my fixed rim 2, and thus I secure my disk 1 to the fixed rim 2 by a sufficient number of rivets to resist any probable strain.

At intervals around the circumference internally threaded blocks 9 are attached to the disk and fixed rim by rivets through their flanges 10, the blocks serving both for receiving screws 11 attaching the demountable rim to the fixed rim and as somewhat broad clamping members for the relatively thin metal.

The demountable rim 4 has a series of depressions 12, around the circumference for the purpose of making inclined faces in contact with the inclined surfaces 3 of the fixed rim 2. In place of making depressions 12 I may, if desired, secure to the rim 4 suitable wedge blocks or a wedge ring, or I may roll a special section having an inclined surface to bear on the inclined face 3, leaving the inside of the rim 4 smooth, but I prefer to make the depressions as they are inexpensive and immaterial as to the female side.

The demountable rim 4 is provided with an ordinary flange 13 for what is known as a "straight side" tire, but its shape may be changed to suit the form of tire used. On the other side of the rim 4 I provide the inward projecting flange 14 which extends in vertical arrangement and is turned over at 15 to form a shoulder against which there rests the inner edge 16 of the companion flange 17 that forms the other side of the normal rim. The companion flange 17 is secured to the flange 14 by screws 18, which pass through the flange 14 and engage blocks 19 having flanges 20 fixed to the flange 14 of the rim 4.

The inner marginal portion of the flange 14 is curved around and terminates at 22 forming a groove 23 in which there extends the side 24 of the flange of the fixed rim 2, when the demountable rim 4 is secured to the wheel. Thus when the rim 4 is bolted on to the fixed rim 2, the inclined surfaces 3 of the fixed rim together with the flange 24 interlock and make the rim 4 as it were, a unitary part of the wheel itself, adapted to take not only thrusts or strut strains, but also tension strains, thus making a very solid wheel and making useful all the metal employed, even though it performs other functions than simply taking the load of the wheel.

In certain types of wheels the flange 14 of the rim 4 is in an inclined position as shown in Figure 6, instead of the vertical arrangement as shown in the other figures.

I have shown the companion flange 17 with its flange 18 cut away with clearance holes 25, so that the screws 11 clamp directly on to the flange 14 in holding the demountable rim on to the wheel, but this is a matter of choice and these bolts may bear directly on the flange 16 and serve as additional clamping means for holding the companion flange 17 in its place of work.

However, in this arrangement, when a tire is removed the screws 11 would have to be taken out as well as the screws 18, but in the case as I have shown the drawings, the companion flange 17 might be taken off and the tire removed without demounting or loosening the screws 11 from the wheel.

It is desirable to have the companion flange 17 secured as rigidly as possible to the rim 4 and it to the wheel, as on occasions the whole load of the wheel is accidently borne by this flange when the wheel runs into a rut alongside of a track or other obstacles. The arrangement I have provided, where in the flange 16 butts against the shoulder 15, relieves the screws 18 from such a load although the screws will aid in bearing it.

In turning over the flange 14 of the rim, there is a curve developed at 26 and to lessen the effect of this curve, as relates to the bearing of the tire on the tread of the wheel, I form the rib 27 in the companion flange 17, which is desirable.

What I claim is:—

1. A fixed wheel rim having a plane central annular portion provided with oppositely turned lateral annular flanges at its margins, respectively, combined with a removable, tire-carrying rim supported by each of said flanges.

2. The combination with a wheel rim having a fixed annular portion approximately parallel to the medial plane of the wheel provided at one margin with a laterally diverging flange and at its opposite margin with an oppositely extending flange fitting and fixed to said annular portion and the flange first mentioned.

3. In a wheel, the combination with a fixed rim having an annular portion approximately parallel to the medial plane of the wheel and provided at its margins with oppositely extending annular flanges to support a removable tire-carrying rim, and a wheel body overlapping and laterally fixed to said annular portion.

4. The combination with a wheel body web having a peripheral portion in a plane approximately perpendicular to the wheel's axis and bent laterally to form a conical flange on one side of said plane, of a fixed rim having its medial annular part fixed to said portion and merging on one side into a flange fitting over said conical flange and on its opposite side merging into a cylindrical flange on the opposite side of said plane.

5. The combination with a wheel body web having a peripheral portion in a plane approximately perpendicular to the wheel's axis and bent laterally to form a conical flange on one side of said plane, of a fixed rim having its medial annular part fixed to said portion and merging on one side into a flange fitting over said conical flange and on its opposite side merging into a cylindrical flange on the opposite side of said plane, and a demountable rim in tongue and groove engagement with the cylindrical flange and rigidly fitting upon said conical flange.

6. The combination with a wheel disk having a peripheral portion in a plane approximately perpendicular to the wheel's axis and provided at one margin with a laterally extending conical flange, of a fixed rim having a plane medial part fixed to said portion and merging on one side into a flange fitting over said conical flange and on its opposite side merging into an oppositely extending cylindrical flange, and a demountable rim in tongue and groove engagement with the cylindrical flange and provided with a series of depressions fitting the conical flange.

Signed at Chicago, in the county of Cook and State of Illinois, this ninth day of September, 1919.

WILLIAM ERASTUS WILLIAMS.

Witnesses:
B. J. BERNHARD,
JOHN B. JEFFERSON.